United States Patent [19]
Buckwold

[11] Patent Number: 5,247,666
[45] Date of Patent: Sep. 21, 1993

[54] DATA MANAGEMENT METHOD FOR REPRESENTING HIERARCHICAL FUNCTIONAL DEPENDENCIES

[75] Inventor: Jonathan Y. Buckwold, Brookline, Mass.

[73] Assignee: Fawnwood, Inc., Brookline, Mass.

[21] Appl. No.: 706,254

[22] Filed: May 28, 1991

[51] Int. Cl.$^5$ ............................................. G06F 15/40
[52] U.S. Cl. .................... 395/600; 364/DIG. 1; 364/222.81; 364/222.82; 364/283.1; 364/283.2
[58] Field of Search ................ 364/DIG. 1, DIG. 2; 395/575, 600, 700

[56] References Cited

U.S. PATENT DOCUMENTS

| | | | |
|---|---|---|---|
| 3,916,387 | 10/1975 | Woodrum | 395/800 |
| 4,390,945 | 6/1983 | Olsen et al. | 395/425 |
| 4,764,867 | 8/1988 | Hess | 395/160 |
| 4,794,528 | 12/1988 | Hirose et al. | 395/600 |
| 4,803,651 | 2/1989 | Galkowski | 395/500 |
| 4,817,036 | 3/1989 | Millett et al. | 395/600 |
| 4,908,759 | 3/1990 | Alexander, Jr. et al. | 395/600 |
| 4,945,475 | 7/1990 | Bruffey et al. | 395/600 |
| 5,101,493 | 3/1992 | Travis et al. | 395/700 |

FOREIGN PATENT DOCUMENTS 0336580 11/1989 European Pat. Off. .

OTHER PUBLICATIONS

Cormen et al., "Introduction To Algorithms," 1989 pp. 377-394.
Buckwold et al., "A Database System for Capturing & Reporting Cardiac Catheterization Results", Sep. 1990, pp. 1-3.
Berg, C., "the Theory of Graphs", 1962, pp. 1-11.
Ullman, J., Principles of Database & Knowledge Base Systems, 1988, pp. 377-445.
Date, "Intro To Database Systems, vol. I", 1986 pp. 503-520.

Primary Examiner—Thomas C. Lee
Assistant Examiner—John C. Loomis
Attorney, Agent, or Firm—Robert Halper

[57] ABSTRACT

A data management method for representing hierarchical functional dependencies. Data are modeled as assertions assigning values to attributes along a path of dependencies. Attributes are created by specifying their parents and are assigned identifiers which distinguish them from their siblings. Assertions are stored as storage sequences, which are identifiers corresponding to the attributes of a path alternating with values assigned to the attributes. Storage sequences are stored as indices of a hierarchical data structure. Application values are stored in the tree with predecessors, and deleted with dependents. Assertions are denoted by function assignments which assign values to function instances. Function instances may reference multiple values, and attributes may be created at any time. Data storage, access and deletion are efficient.

17 Claims, 15 Drawing Sheets

PRIOR ART

| Person | Sex | Visit | Complaint |
|---|---|---|---|
| Sam | male | 1/1/90 | pallor |
| Sam | male | 1/1/90 | weakness |
| Joe | | 1/1/90 | |
| Sue | | | chest pain |

FIG. 1

PRIOR ART

| Person | Sex |
|---|---|
| Sam | male |

| Person | Visit | Complaint |
|---|---|---|
| Sam | 1/1/90 | pallor |
| Sam | 1/1/90 | weakness |
| Joe | 1/1/90 | |

FIG. 2

APPLICATION PROGRAM 12 formal expression 22

Complaint('Sam','1/1/90')

TRANSLATE 16 identifiers 49

'2.3.1' arguments 50

'Sam','1/1/90' address sequence 24

| 2 | 'Sam' | 3 | '1/1/90' | 1 | storage address 48

^d(2,'Sam',3,'1/1/90',1)

FIG. 11

| Data Statements | DATA STRUCTURE 19 |
|---|---|
| | Storage Sequences |

Data Statements:

Position('Person') = '2'

Count('Person') = '3'

Position('Birthday') = '2.1'

Position('Sex') = '2.2'

Position('Visit') = '2.3'

Count('Visit') = '3'

Position('Complaint') = '2.3.1'

Position('Test') = '2.3.2'

Count('Test') = '2'

Position('Glucose') = '2.3.2.1'

Position('Sodium') = '2.3.2.2'

Position('Therapy') = '2.3.3'

Count('Therapy') = '1'

Position('Indication') = '2.3.3.1'

Storage Sequences:

| 1 | 'Person' | 1 | '2' |
| 1 | 'Person' | 2 | '3' |
| 1 | 'Birthday' | 1 | '2.1' |
| 1 | 'Sex' | 1 | '2.2' |
| 54  1 | 'Visit' | 1 | '2.3'  59 |
| 1 | 'Visit' | 2 | '3' |
| 55  1 | 'Complaint' | 1 | '2.3.1'  60 / 63 |
| 56  1 | 'Test' | 1 | '2.3.2'  61 |
| 57  1 | 'Test' | 2 | '2'  62 |
| 1 | 'Glucose' | 1 | '2.3.2.1' |
| 1 | 'Sodium' | 1 | '2.3.2.2' |
| 1 | 'Therapy' | 1 | '2.3.3' |
| 1 | 'Therapy' | 2 | '1' |
| 1 | 'Indication' | 1 | '2.3.3.1' |

FIG. 13

| Data Statements | DATA STRUCTURE 19 |
| --- | --- |
| | Storage Sequences |
| Count('Root') = '1' | 64 [1] 'Root' [2] '1' |
| Position('Function') = '1' | 65 [1] 'Function' [1] '1' |
| Count('Function') = '2' | 66 [1] 'Function' [2] '2' |
| Position('Position') = '1.1' | 67 [1] 'Position' [1] '1.1' |
| Position('Count') = '1.2' | 68 [1] 'Count' [1] '1.2' |

DATA MANAGEMENT METHOD FOR REPRESENTING HIERARCHICAL FUNCTIONAL DEPENDENCIES

BACKGROUND OF THE INVENTION

1. Field of the Invention

This invention relates in general to computer database systems, and in particular to a data management method for representing hierarchical functional dependencies.

2. Description of Related Art

A significant problem for computer database systems is the efficient management of large volumes of data which generally reside on hard disks or similar storage media. One solution for this problem is the hierarchical, or indexed-sequential, method of data management. Hierarchical databases typically rely on the B-tree algorithm for the actual physical organization of data within hard disk storage. This algorithm is extremely efficient both for sequential access of all data, and for indexed access of an individual data value. The B-tree algorithm organizes disk storage as a complicated hierarchy of pointers, indices and data. As data are stored and deleted, the algorithm may rearrange these internal structures. Thomas H. Cormen et. al. discuss the B-tree algorithm in Chapter 19 of Introduction to Algorithms (Cambridge, Mass.: The MIT Press, 1990).

The Bruffey U.S. Pat. No. 4,945,475 describes a hierarchical filing system organized as a B-tree structure.

The intricacies of the actual physical organization of data are generally hidden from the programmer, who references data using a programming language by means of logical specifications which are translated to the physical data address. MUMPS is an example of such a database system MUMPS is a registered trademark of the Massachusetts General Hospital. It is the third ANSI language after FORTRAN and COBOL. In MUMPS, data are stored in hierarchical data structures in both secondary and main memory as entries which consist of a sequence of indices, expressed as a function, addressing one data value. For example, Complaint(Sam,1/1/90)=pallor is a simplified MUMPS expression for storing data value, pallor, at the address indexed by Complaint(Sam,1/1/90). The " " signifies storage within a MUMPS database. Since data are stored hierarchically, deletion of the data value addressed by an index also deletes all other data values addressed by extensions of that index. For the above example, deleting the value of Complaint(Sam) also deletes the value of Complaint(Sam,1/1/90).

MUMPS has one data type: a character string. Numbers are also strings, and every string has a numerical value. The empty string is denoted by " " and has a numerical value of 0. MUMPS also has various string processing functions, including: $E, which extracts a character; $L, which returns the length of a character; $P which returns a delimited piece; and, '_', which concatenates two strings.

Although hierarchical databases and their auxiliary programming tools facilitate database construction, much effort and programming expertise is required for construction of individual database applications.

The Bachman U.S. Pat. No. 4,631,664 discusses programming problems related to the construction of database applications and describes various data models.

The Huber U.S. Pat. No. 4,791,561 also discusses the considerable effort required for the construction of database applications, as well as the desirability of having such applications constructed by users who themselves are not programmers.

Many difficulties of database construction are alleviated by relational databases, which organize data into tables. The simplicity of the relational model enables many applications to be constructed quickly without special expertise. For some applications, however, there exist relationships among the application data which can not be naturally represented by the relational model.

For example, FIG. 1 illustrates a relation representing patients seen at a clinic. The name, gender, date of visit, and reason for the visit are entered respectively as values of the attributes Person, Sex, Visit and Complaint. Each column contains values belonging to one attribute. The first column, for example, contains values of the attribute Person. Each row contains associated values. The first row states that Sam, a male, visited the clinic on 1/1/90 because of pallor. The second and third rows of the relation are interpreted in a similar fashion. The fourth row, however, is meaningless, because it states chest pain as the reason for Sue's visit which did not occur.

The database of the example could have become corrupted in one of two ways: either no value was entered for Sue's Visit, or else a value was entered, but was subsequently deleted. The general problem, illustrated by this example, is called the problem of functional dependencies. The term "functional" is appreciated when Complaint is regarded as a data function, Complaint(Visit), which depends upon its argument, Visit.

For database applications having dependencies among attributes, values should not be stored without others upon whom they depend, and values should not be deleted without their dependents. In order for dependencies to be maintained, they must be represented in some fashion. Since the relational data model per se can not represent dependencies, additional methods are required. One solution is to write programs which check for dependencies when data are stored or deleted. This solution requires programmers for database construction. The generally recommended solution is to design the database as a collection of smaller relations which are determined according to the methods of either the Boyce-Codd or the third normal form. Implementation of the recommended solution entails time and effort, and the resulting database is often impractical. Furthermore, the method is useful for initial database design, but inappropriate for modification of a database into which data has already been entered.

A related problem of the relational model is the difficulty of representing attributes which have multiple values. For example, in FIG. 1, Sam, on 1/1/90, complains both of pallor and of weakness. Since only one value may be entered into each cell of the relation, an entire row is needed to represent each of the multiple values. In the example, the first row represents pallor and the second row represents weakness. Except for the different values of Complaint, all other values of these two rows are identical, so that storage is wasted. The recommended solution for this problem is to replace the original relation with several smaller ones by the method of the fourth normal form. An example of such a solution is illustrated in FIG. 2, which shows two smaller relations which replace the relation of FIG. 1.

Decomposing relations into smaller ones, however, mars the simplicity and ease of use of the relational model. The problems of functional and multivalued dependencies are discussed by Jeffrey D. Ullman in Chapter 7 of Principles of Database and Knowledge-Base Systems (Rockville, Md.: Computer Science Press, 1988).

An attribute with multiple values corresponds to a function whose value is a set. Such a function is multivalued, according to the terminology of Claude Berge, in Chapter 1 of The Theory of Graphs and its Applications (New York, N.Y.: John Wiley & Sons, Inc., 1964).

Hierarchies, also called trees, forests, and acyclic graphs, are ubiquitous in computer software, and many different methods for representing them within computers are known and used. The representation chosen for a particular program is largely determined by the program's purpose and constraints.

J. Buckwold et. al. in "A Database System for Capturing and Reporting Cardiac Catheterization Data" in Computers in Cardiology (in press: IEEE Computer Society, 1991) describe a natural language report application generated by DOC Version 2. DOC generally enforces hierarchical functional dependencies for applications which it generates. This is accomplished by a complex method: the sequence of data-entry forms forces entry of predecessors for dependent values; and, within storage, dependencies are maintained by a fixed address scheme with parameters that receive values according to their menu type. The method of DOC lacks a data model for representing dependencies, is not generally applicable, and introduces spurious dependencies for different values having the same menu type. However, within the context of usage for which these problems are avoided, the restriction to hierarchical dependencies does not appear to be a significant limitation. Thus, experience with DOC suggests that a solution for the special case of hierarchical functional dependencies may be adequate in practice.

The Hirose U.S. Pat. No. 4,794,528 describes a pattern matching method which converts an n-ary data tree into a vector of constant-length memory cells by placing, into each cell, in order of transverse search, the value of a node preceded by its position. This method is inappropriate for representing hierarchical dependencies of a database for several reasons. First, converting an entire database into one vector is impractical. Second, many values, such as names and addresses, are character strings of varying, multiple word length. Third, attributes do not generally form an n-ary tree. Finally, arranging the values in order of breadth-first search of the tree confers no obvious advantage for representing dependencies.

The Lowry U.S. Pat. No. 4,864,497 describes a common data structure for access by several application programs. The hierarchical storage management technique of the Lowry patent does not address the problem of functional dependencies.

The Galkowski U.S. Pat. No. 4,803,651 describes a document comparison method for encoding, as two separate lists, a hierarchy representing a formatted document.

The Potter U.S. Pat. No. 4,733,354 describes a hierarchical database organization to facilitate medical diagnosis.

Whatever the precise merits, features and advantages of the above cited references, none of them achieves or fulfills the purposes of the present invention.

OBJECTS OF THE INVENTION

The principal object of the present invention is a method of data management which enables simple specification and enforcement of hierarchical functional dependencies.

A second object is that the method enable storage of multiple data values for individual data items.

A third object is that the method permit creation of new data attributes at any time, even after a complete database application has been constructed and data entered.

SUMMARY OF THE INVENTION

These and other objects are achieved, according to the present invention, by representing attributes by corresponding child identifiers, by representing data as assertions, and by encoding assertions as formal expressions for data reference, and as storage sequences for data storage.

A new attribute is created, after database initialization, by specifying the family of the new attribute. For each new attribute created, a corresponding child identifier, which distinguishes siblings, and a hierarchical position, which represents dependencies, is computed and stored.

Application data are modeled as assertions, which are dependency paths having assigned values. An assertion may be encoded as a data statement which assigns a value to a formal expression. A data statement which assigns a value to a function instance is similar to conventional function notation, except that a function instance may have multiple values, and that its arguments are in order of dependencies.

Assertions are encoded in disk memory as storage sequences, which are indices of a hierarchical data structure. A storage sequence lists, in order, for each attribute of the associated path, the child identifier of the attribute followed by the asserted value of the attribute.

Attributes may be created at any time. Function instances reference application data and express dependencies simply and naturally. Values in storage sequences are stored with predecessors and deleted with dependents. Multiple values may be stored at a storage address. Storage, access, and deletion of values is efficient. The advantages of the present invention are obtained with only a minimal cost of additional storage space allocated for storage of child identifiers.

The accompanying drawings which are incorporated in and which constitute a part of this specification, illustrate an embodiment of the invention and, together with the description, explain the principles of the invention.

BRIEF DESCRIPTION OF THE DRAWINGS

FIGS. 1 and 2 are diagrams showing prior art, illustrating, respectively, for the relational data model, a problem of functional dependencies, and a typical solution.

FIG. 11 is a diagram illustrating the translation of a function instance to a storage address.

FIG. 13 is a diagram illustrating, for created attributes, storage sequences containing family counts and hierarchical positions, as well as the corresponding data statements.

DETAILED DESCRIPTION OF THE INVENTION

Figure 3:
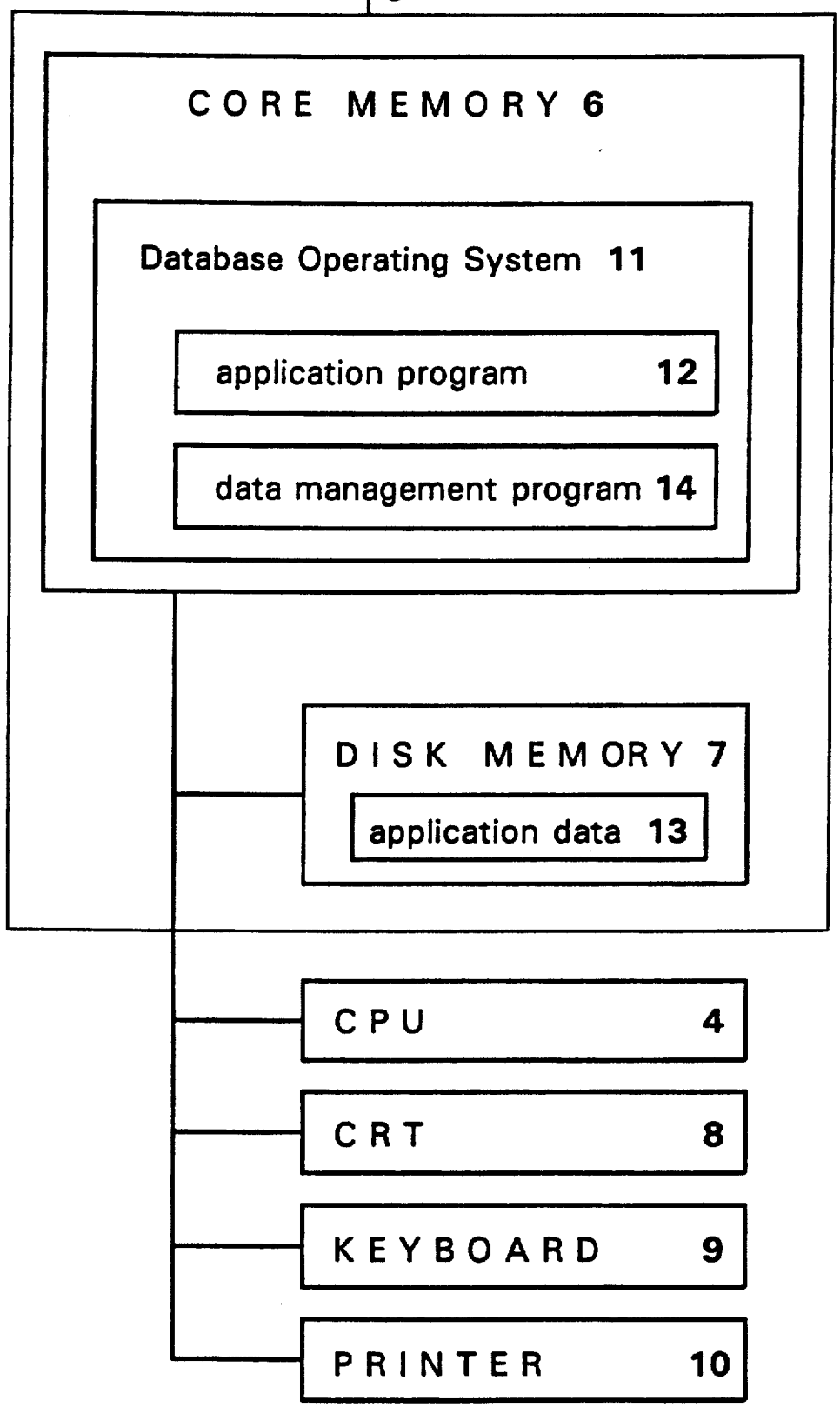
FIGS. 3 and 4 are diagrams illustrating the data management method of the present invention, showing, respectively, an overview of a data processing system, in which a data management program mediates access, by an application program, of application data, and an overview of the method of mediation.

Refer now to FIG. 3, which is a block diagram illustrating an overview of a preferred embodiment of the data management method of the present invention for representing hierarchical functional dependencies of application data. The diagram shows an IBM compatible personal computer data processing system which comprises processor means 4, memory means 5, data entry means 9, and data display means 8 and 10. The memory means comprise 640K core memory 6 and 20 MB hard disk memory 7. The processor means executes instructions, in core memory, of DTM-PC Version 4.2, a database operating system 11 which implements ANSI Standard MUMPS on the IBM compatible personal computer. DTM-PC interprets, via the processor means, programming language instructions, in core memory, of an application program 12 and of the data management program 14. Application data are typically entered by a user via data entry means under control of the application program. The data management program mediates access, by the application program via the processor means, of application data 13 stored in disk memory.

DTM-PC Version 4.2 MUMPS source code of B, the data management program, and of X, an example application program is listed in the attached appendix. The " " precedes names of MUMPS routines. Programming language specifications are found in the DataTree reference manuals (DTM-PC Reference Manual and Operators Guide, DTM-PC Language Reference and Programmer's Guide Version 4.1 Supplement DataTree Inc., 300 Fifth Avenue, Waltham, Mass. 02154). MUMPS is a registered trademark of Massachusetts General Hospital. DataTree and DTM-PC are trademarks of DataTree, Inc. IBM is a registered trademark of International Business Machines Corporation.

Application data values, such as application value 20 (FIG. 4), 'pallor', are stored as character strings. In MUMPS, non-numeric character strings are enclosed in quotation marks, e.g. "Sam", but numeric character strings are not, e.g. 70. When a character string includes quotation marks, the included quotation marks are repeated, e.g. "2,""Sam""". In order not to obscure the description of the present invention with these technical programming language details, character strings will be written without enclosing quotation marks, and values of attributes will be enclosed in single quotation marks, e.g. 2,'Sam'. Precise programming language details for implementation of the present invention are found in the program listings of the attached appendix.

Figure 4:
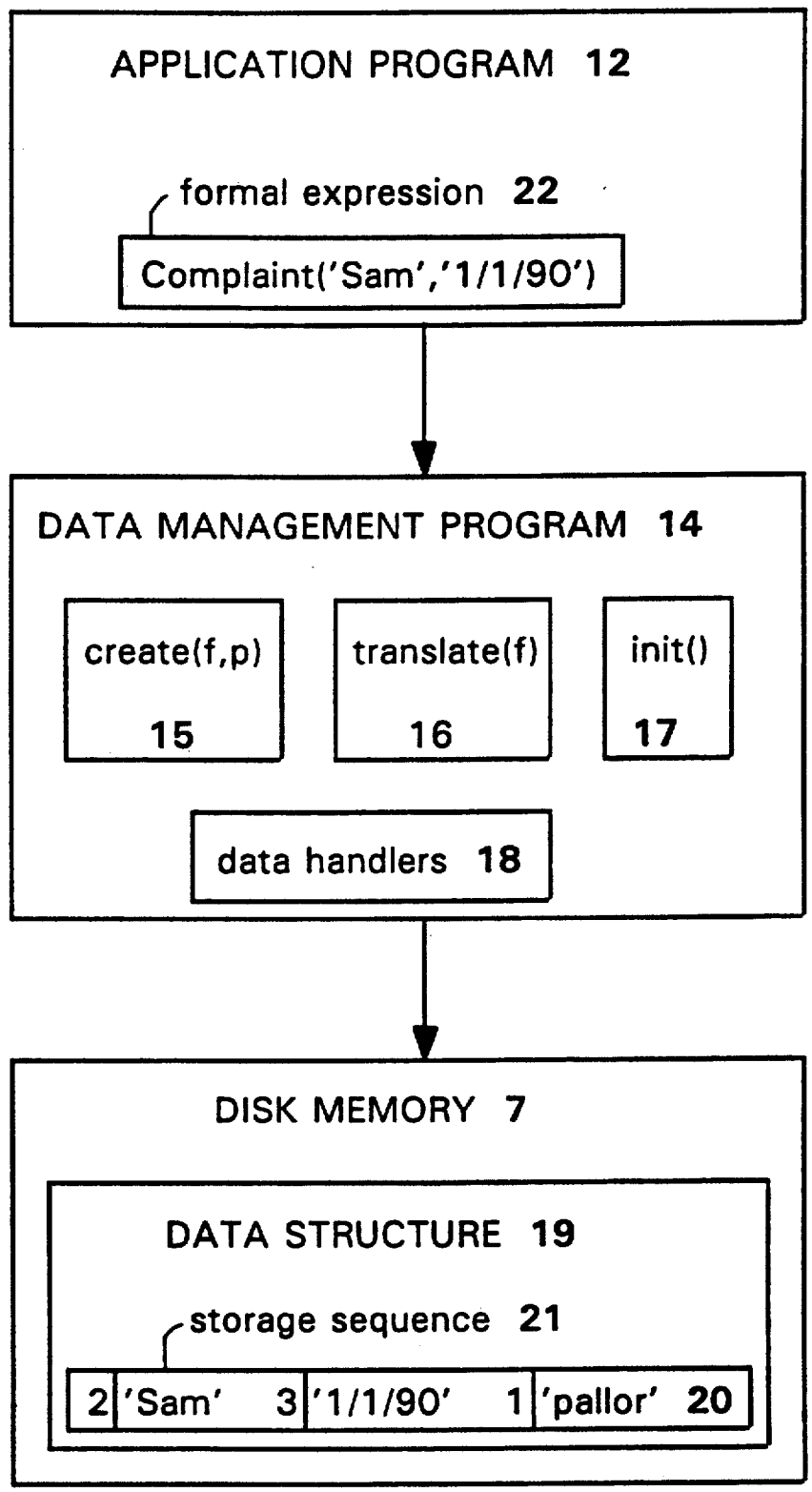

FIG. 4 illustrates an action of data management program 14, which comprises various routines called by an application program. init( ) 17 initializes, and create( ) 15 constructs( ), a database application. translate( ) 16 converts formal expression 22 referencing application data, to a corresponding storage address. Data handlers 18 are called by the application program to access referenced application values located at the storage address. Referenced application value 20 is the final member of storage sequence 21, which is stored in disk memory as indices of hierarchical data structure 19, d. In the example, the application program has referenced Complaint('Sam','1/1/90'), retrieving 'pallor'.

The data management program enables representation and enforcement of hierarchical functional dependencies of application data. Consider for example, a database application for recording application data regarding patient visits at a clinic. For this example, the classes of application data to be stored include: patient name, gender, date of visit, reason for visit, body fluid tested, glucose measure, sodium measure, therapy, and justification for therapy. These classes of application data are entered, respectively, into the database, as values of attributes Person, Sex, Visit, Complaint, Test, Glucose, Sodium, Therapy and Indication. In order for the database to correctly reflect the reality of patient visits, functional dependencies must be represented and maintained. For the example, attributes Birthday, Sex and Visit depend upon attribute Person, since, in the absence of a patient, a date of birth, sex, or date of visit is meaningless. Similarly, Complaint, Test, and Therapy depend upon Visit, since each reveals information about a visit. Also, Glucose and Sodium depend upon Test, and Indication depends upon Therapy.

Figure 5:
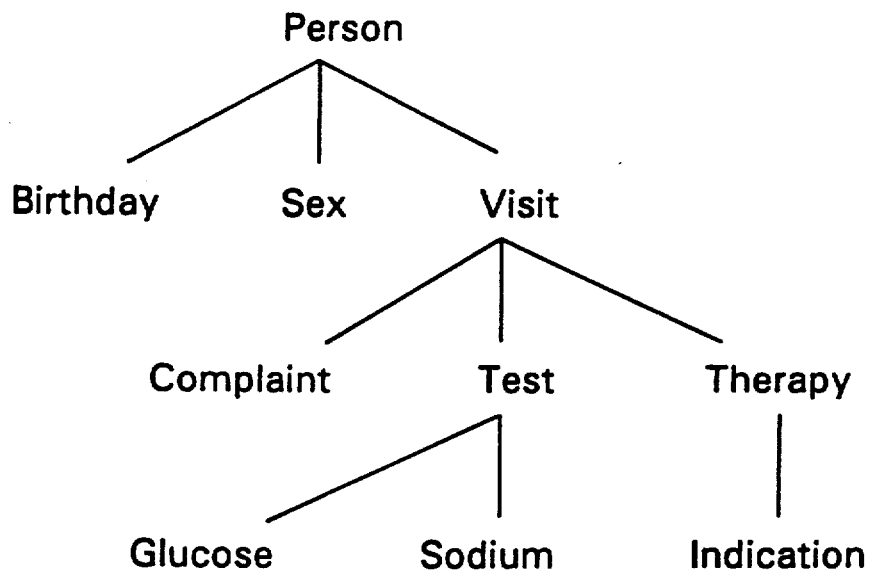
FIGS. 5 and 6 are diagrams illustrating hierarchical functional dependencies of example application data, showing, respectively, attributes related by dependencies, and child identifiers corresponding to created attributes.

FIG. 5 illustrates the functional dependencies of the example application described. Shown are attributes, depicted as nodes in a tree related by dependencies, depicted as connected lines. A dependency is a relationship between two attributes; for any two attributes whose nodes in the tree are joined by connected lines, the attribute of the bottom node depends upon the attribute of the top node. For example, Indication, joined by connected lines to Visit, depends upon Visit. When two attributes are joined by one line, the top attribute is a parent of the bottom attribute, and the bottom attribute is a child of the top attribute. For example, Test is a parent of its child Sodium.

In the example, dependencies are hierarchical, each attribute having at most one parent. In a hierarchy, a specified attribute has one path, one family, and zero or more predecessors.

A path is a parental lineage, which is a sequence of attributes, beginning at an attribute having no parent, a root. Each non-terminal attribute of a parental lineage is the parent of the attribute which follows it in the sequence. For example, Person.Visit.Test is a parental lineage, or path, since Person, a root, is the parent of Visit, which is the parent of Test. The path, or dependency path, of a specified attribute, is a path which has that attribute as terminal attribute. For example, Person.Visit.Test is the path of its terminal attribute, Test.

A family is either the collection of roots, or a collection of attributes having a common parent. For example, {Person} is the family of roots, {Complaint,Test,Therapy} is the family of Visit, and {Indication} is the family of Therapy. Attributes of the same family are siblings. For example, Complaint, Test and Therapy are siblings.

The predecessors of a specified attribute are the non-terminal attributes of its path. For example, the predecessors of Test are Visit and Person.

Figure 6:
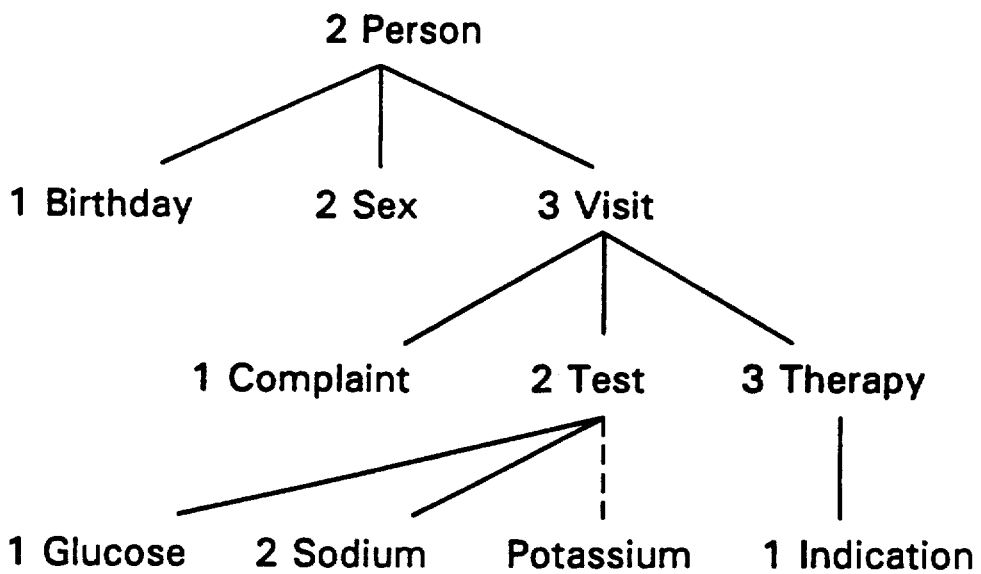

FIG. 6 illustrates the method for creating attributes by computing, for each newly created attribute, a corresponding child identifier which is distinct from child identifiers corresponding to previously created siblings of the new attribute. Shown are attributes of the example application, each labeled with a child identifier. For example, Test is labeled with child identifier 2. The shown child identifiers distinguish among siblings. For example, in the family of Person, each attribute corresponds to a distinct child identifier: Birthday to 1, Sex to 2, and Visit to 3.

Also shown, is a new attribute Potassium which is to be created for the family of Test. The child identifier corresponding to Potassium would be computed to be 3, differing from 1 and 2, respectively the child identifiers previously computed for the siblings of Potassium, Glucose and Sodium. The method of computation of child identifiers will be explained in FIG. 13.

Figure 7:
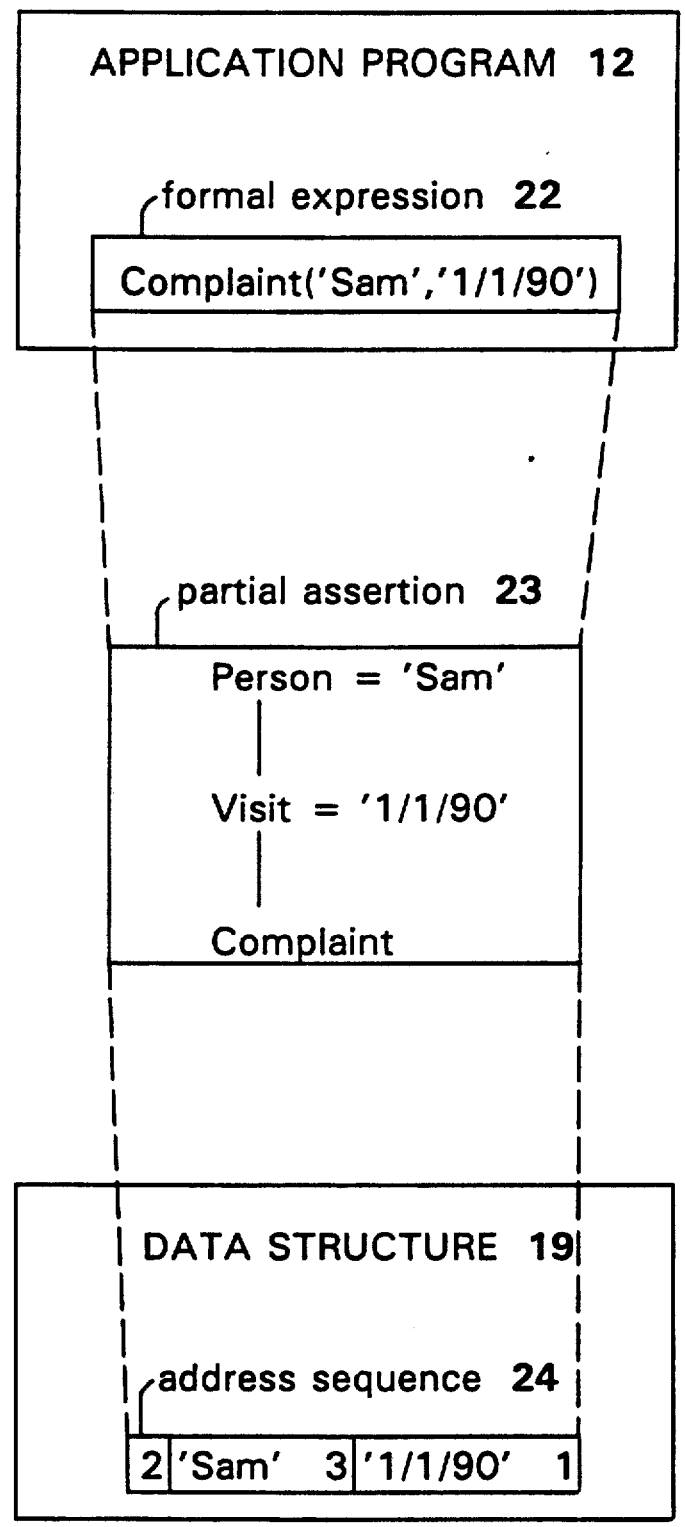
FIG. 7 is a diagram showing a partial assertion encoded by a formal expression referencing application data, and by an address sequence indexing the data in a hierarchical data structure.

FIG. 7 illustrates the method for modeling data references. In the example shown, an inquiry about Sam's complaint on Jan. 1, 1990 is encoded in the application program as formal expression 22, Complaint('Sam','1/1/90'), and corresponds to address sequence 24, 2,'Sam',3,'1/1/90',1, which indexes the referenced values in data structure 19. 22 and 24 reference the same data because both encode partial assertion 23.

A partial assertion has a significant attribute and an associated path, which is the dependency path of the significant attribute. In the example, the significant attribute is Complaint and the associated path is Person.Visit.Complaint. A partial assertion assigns an asserted value to each non-terminal attribute of the associated path. In the example, Person is assigned asserted value 'Sam', and Visit is assigned '1/1/90'.

A formal expression encodes a partial assertion. In the example, the formal expression is a function instance, Complaint('Sam','1/1/90'), an instance of Complaint(Person,Visit). A function instance has the significant attribute as functor, or function name, and the assigned values, in order of the associated path, as arguments. In the example, the functor is significant attribute Complaint, and the arguments are the assigned values 'Sam','1/1/90'.

An address sequence also encodes a partial assertion, comprising, for each non-terminal attribute of the associated path, in order of the associated path, the child identifier corresponding to the attribute, followed by the asserted value assigned to the attribute. An address sequence ends with the child identifier corresponding to the significant attribute. In the example, the first attribute of associated path Person.Visit.Complaint, Person, has corresponding child identifier 2 (FIG. 6) and assigned value 'Sam', contributing 2,'Sam' as the first two members of the address sequence. The second attribute Visit contributes 3,'1/1/90', and the significant attribute, Complaint, contributes its corresponding child identifier 1, resulting in address sequence 2,'Sam',3,'1/1/90',1.

Figure 8:
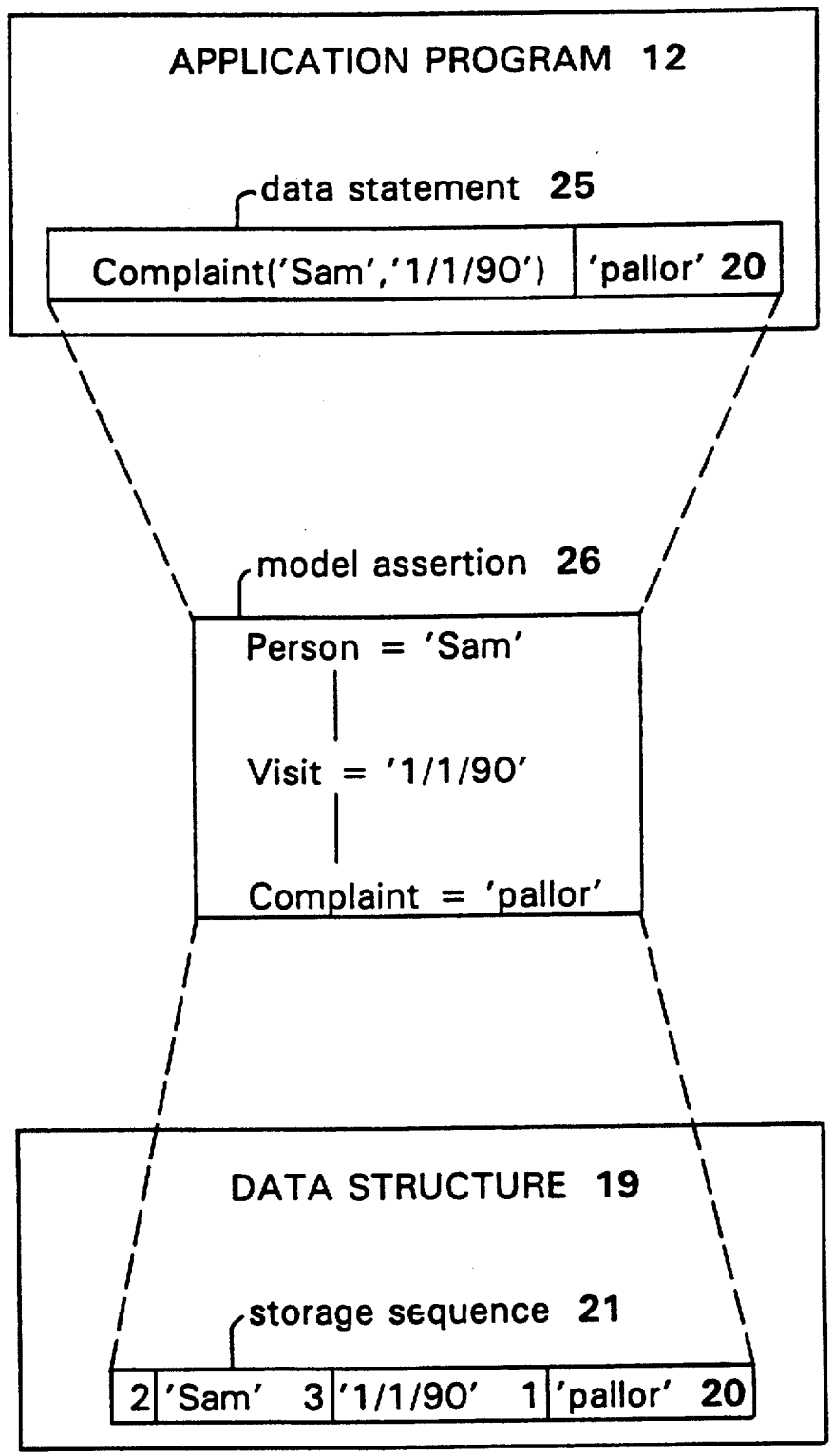
FIG. 8 is a diagram showing a model assertion, representing application data, encoded as a data statement, and as a storage sequence.

FIG. 8 illustrates the method for modeling application data. For the example shown, application data stating that Sam complained of pallor on 1/1/90 are encoded as data statement 25 in the application program and as storage sequence 21 in disk memory. 25 and 21 represent the same data because both encode the same model assertion 26.

A model assertion is obtained by assigning a value, the significant value, to the significant attribute of a partial assertion. In the example shown, significant attribute Complaint of partial assertion 23 (FIG. 7) is assigned application value 20, 'pallor', the significant value.

A model assertion contains one nested assertion for each predecessor of the significant attribute. The nested assertion for Visit is Person='Sam',Visit='1/1/90', and the nested assertion for Person is Person='Sam'.

A model assertion is encoded as a data statement for expressing application data. Example data statement Complaint('Sam','1/1/90')='pallor' is a function assignment, which assigns significant value 'pallor' to function instance Complaint('Sam','1/1/90'). The nested assignments of Complaint('Sam','1/1/90')='pallor' are Visit('Sam')='1/1/90' and Person()='Sam'.

A model assertion is also encoded as a storage sequence. A storage sequence comprises the address sequence of the partial assertion extended by the significant value. In the example, address sequence 24 is extended by significant value 20, 'pallor', giving storage sequence 21. A storage sequence has nested sequences which correspond to the nested assertions. The nested sequences of 21 are 2,'Sam',3,'1/1/90' and 2,'Sam'.

Figure 9:
FIGS. 9 and 10 are diagrams illustrating example application data depicted, respectively, as logical storage sequences with corresponding data statements, and as physical storage sequences.

FIG. 9 illustrates example application data encoded both as data statements and as storage sequences. Data statement 27 asserts that Sam was born on Oct. 3, 1980. Data statements 25 and 28 assert, respectively, that pallor and weakness were noted on Sam's visit on Jan. 1, 1990. Data statement 29 asserts that Sam's blood glucose on Jan. 1, 1990 was 70. Data statement 30 asserts that Sam, on the visit of Jan. 1, 1990, was educated, because of insulin overdose. Data statement 31 asserts that Sam, on the visit of Jan. 1, 1990, was treated with orange juice, because of hypoglycemia. The illustrated storage sequences correspond, respectively, to the data statements.

Figure 10:
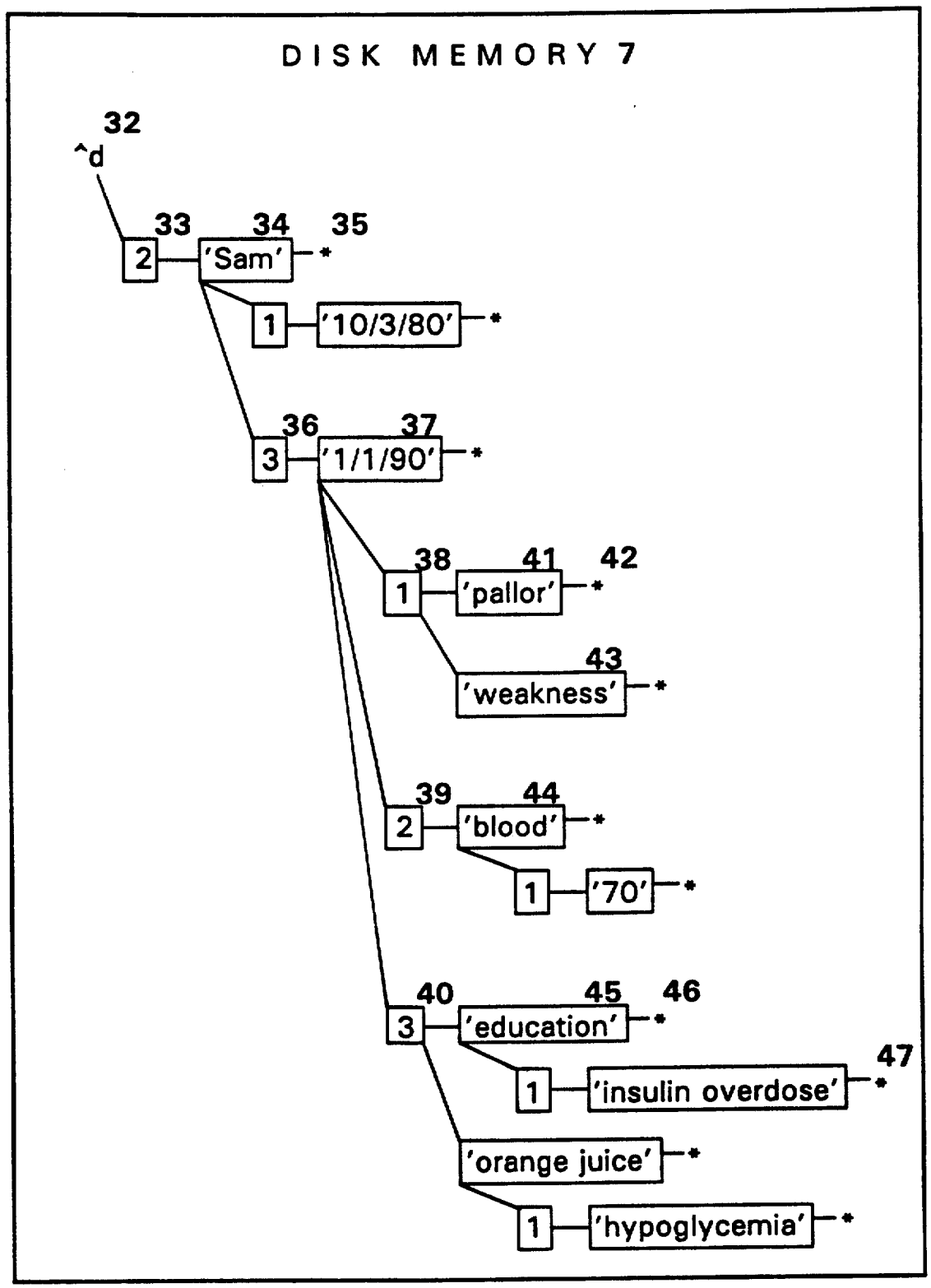

FIG. 10 depicts the organization of hierarchical data structure d having the storage sequences of FIG. 9 as indices. The numbered items represent physical storage locations. The data structure is organized by MUMPS as a collection of indexed data values, each depicted as a path ending at a leaf, such that no index is the parent of more than one leaf. For a specified path, the root is the location of the data structure, the leaf is the location of the data value, and the intermediate nodes are locations of indices. For example, 32.33.34.35 is the path, in data structure d 32, of the data value stored in leaf 35, and indexed by 2,'Sam' 33.34. Although a path must end with a leaf containing a data value, the method of the present invention stores no application information in the leaf, but instead stores the empty string " ". Thus, all leaves have empty string " " as data value.

The address of a storage location is the path of its parent. For example, the address of leaf 35 is the path 32.33.34 of its parent, index location 34. The address is also represented, by listing the stored values, as d(2,'Sam'). A path is created by assigning a data value to an address. For example, SET d(2,'Sam')=" " creates the path of leaf 35. A bound index is a parent of a data value. For example, 34, the parent of leaf 35, is a bound index. An index which is not bound is free. For example, 33 is a free index.

The method of the present invention stores each application value as a bound index, and each storage sequence as the indices of a path. For example, application value 'pallor', is stored at index location 41 bound to leaf 42, and storage sequence 21 (FIG. 9), 2,'Sam',3,'1/1/90',1,'pallor', is stored as the indices of the path of leaf 42. The binding of application values causes nested sequences to also be stored as indices of paths. For example, when storage sequence 21 is stored, the binding, to 35, of application value 'Sam', stored in 34, creates the path of 35 having nested sequence 2,'Sam' as indices.

Storage sequences correspond to paths, and every stored application value is the significant value of a path. For example, application value 'education', stored in 45, is the significant value of the path of leaf 46, 32.33.34.36.37.40.45.46, which corresponds to storage sequence 2,'Sam',3,'1/1/90',3,'education', the indices of the path.

A storage address is the address of an application value. For example, 32.33.34.36.37.40, also represented as d(2,Sam,3,1/1/90,3), is the address of application value 'education', in index location 45. The indices obtained upon removing the root from the storage address gives the address sequence. For example, removing 32 from the above storage address gives 33.34.36.37.40, which, upon listing the contained application values, results in 2,'Sam',3,'1/1/90',3, the address sequence of 'education', in 45.

Multiple significant values referenced by a function instance all have the same storage address. For example, 'pallor' and 'weakness', significant values respectively of storage sequences 25 and 28 (FIG. 9), referenced by Complaint('Sam','1/1/90'), are stored respectively at 41 and 43, and have the same storage address 2,'Sam',3,'1/1/90',1, the indices of the path of 38.

FIG. 10 illustrates the purpose of storing child identifiers together with application values. 'weakness', 'blood', and 'education', stored respectively at index locations 43, 44 and 45, are application values of sibling attributes Complaint, Test and Therapy (FIG. 5). Were child identifiers not stored, these sibling values would all become children of index location 37, so that all would reside at the same storage address. Because of the distinct child identifiers. 1, 2 and 3, stored respectively at index locations 38, 39 and 40, the sibling values do have different storage addresses, as desired.

Storage sequences enforce hierarchical functional dependencies of application data. Insertion of a significant value is equivalent to storing its storage sequence, which contains the asserted values of predecessors. Deletion of a significant value is equivalent to deletion of its storage sequence, which causes the entire subtree extending the storage sequence, and containing the dependents, to be deleted. For example, significant value 'education' can not be inserted into 45, without also storing its predecessors, 'Sam', and '1/1/90', in 34 and 37, respectively. Also, deletion of significant value 'education' from 45, eliminates the path to 'insulin overdose', stored in 47, deleting the dependent value. Because of the physical organization of storage, deletion of a storage sequence also deletes all extensions of the storage sequence.

In contrast to leaves, which, having no siblings, may store only one data value at a specified address, indices, having siblings, may store multiple application values at a specified address. Use of disk space is efficient, because each application value is stored at one physical storage location, even though contained in several storage sequences. Access of individual application values is also efficient, because indices are sorted.

FIG. 11 is a diagram illustrating the method for translating a function instance to a storage address. Shown is formal expression 22, function instance Complaint('Sam','1/1/90'), which is converted by translate( ) 16 to storage address 48.

The conversion proceeds in two steps. First, translate( ) converts a function instance to an address sequence. In the example, Complaint('Sam','1/1/90') is converted to address sequence 24 2,'Sam',3,'1/1/90',1. Then % a( ), a data handler, converts the address sequence to storage address d(2,'Sam',3,'1/1/90',1).

translate( ) converts a function instance to an address sequence by splicing the arguments of the function instance with the sequence of child identifiers corresponding to the dependency path of the functor. In the example, functor Complaint has dependency path Person.Visit.Complaint (FIG. 6), which corresponds to the sequence of child identifiers 49, 2.3.1. Sequence 2.3.1 is spliced with arguments 50, 'Sam','1/1/90', producing address sequence 2,'Sam',3,'1/1/90',1. The method for computing the sequence of child identifiers will be explained in FIG. 13, and the method for splicing identifiers and arguments will be described in FIG. 17.

Figure 12:
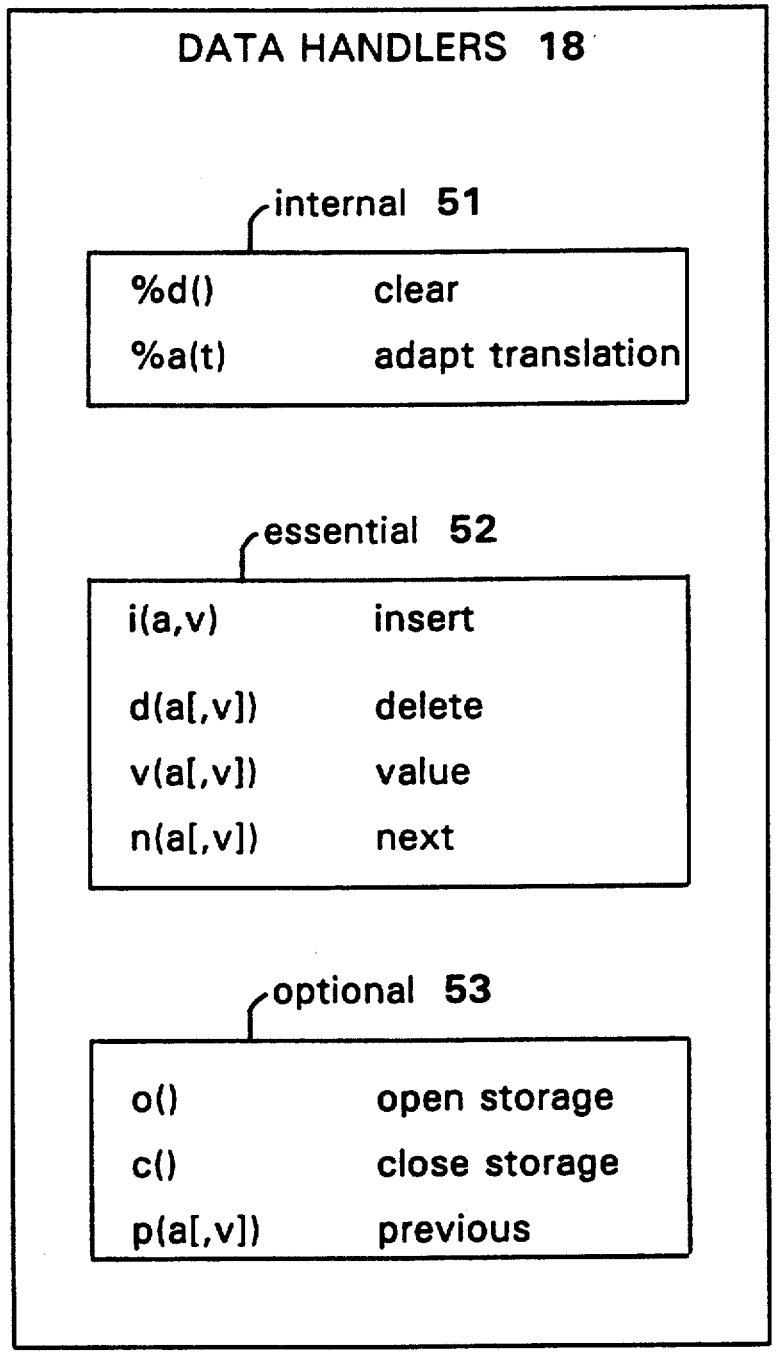
FIG. 12 is a diagram showing data access routines.

FIG. 12 is a diagram showing data handlers 18 divided into groups. Data handlers are called both by the application program and by the data management program, in order to access data values located at a specified storage address and to perform low-level data management. Internal handlers 51 are called by other data management routines. Essential handlers 52 perform data access operations required by create( ). Optional handlers 53 enable adaption to special features of individual target data structures.

In the figure, arguments in brackets, [ ], are optional. For example, d(a[,v]) may be called either with one argument as d(a), or with both arguments as d(a,v). For all routines shown, argument a is a storage address returned by translate( ), and argument v indicates a significant value referenced by the function instance corresponding to argument a.

i(a,v) inserts argument v as a bound index at the storage address specified by argument a. Any predecessor values stored with argument v are checked, and if free, are also bound.

v(a) retrieves the first significant value located at the storage address specified by argument a. If none is there, empty string " " is returned.

v(a,v) returns argument v if it is equal to the significant value of a storage sequence addressed by argument a. Otherwise, empty string " " is returned.

d(a) deletes all significant values located at the storage address specified by argument a.

d(a,v) deletes the significant value equal to argument v and located at the storage address specified by argument a. Also deleted, are all extensions of the storage sequence of the deleted significant value, as explained in FIG. 10.

n(a) is an alternative to v(a).

n(a,v) retrieves the next significant value addressed by argument a which follows argument v. If none is present, empty string " " is returned.

% d( ) clears the target data structure, killing d.

% a(t) converts an address sequence, argument t, to a storage address.

o( ) opens the target data structure for use. o( ) is called once, by an application program before beginning a sequence of data operations, and sets a switch so that empty string " " is returned for undefined variables.

c( ) closes the target data structure. It does nothing for target data structure d.

p(a) retrieves the last significant value located by argument a. If there is none, empty string " " is returned.

p(a,v) retrieves the significant value located by argument a and followed by argument v. If there is none, empty string " " is returned.

FIG. 13 is a diagram illustrating the method of storing, for a created attribute, the count of its family, and the sequence of child identifiers corresponding to its path. Shown are storage sequences stored as a result of creating the database application of FIG. 5, as well as the respective corresponding data statements.

After a child identifier is computed for a newly created attribute, the hierarchical position of the new attribute is also computed and is stored as the significant value of a storage sequence. The hierarchical position of an attribute is a sequence of child identifiers corresponding to the dependency path of the new attribute. The hierarchical position comprises, for each attribute of the dependency path, in order of the dependency path, the child identifier corresponding to the attribute. For example, the hierarchical position of Complaint is 2.3.1 (FIG. 6), which is the sequence of child identifiers corresponding to the attributes of Person.Visit.Complaint, the dependency path of Complaint.

The computed hierarchical position is stored as significant value 60, '2.3.1', of storage sequence 55 1,'Complaint',1,'2.3.1'. Since child identifier 63, 1, of Complaint terminates '2.3.1', it also is stored. The hierarchical position of a new attribute is computed by extending the hierarchical position of its family with the child identifier of the new attribute. For the above example, the hierarchical position of Complaint's family, Visit, is stored as significant value 59, '2.3', of storage sequence 54. Extending 2.3 by 1, the child identifier of Complaint, results in 2.3.1.

FIG. 13 also shows family counts used for the computation of child identifiers. For each family, a count of the number of attributes in the family is maintained in disk memory as the significant value of a storage sequence. Referring to FIG. 6, just before Potassium is created as a new attribute of Test, the family having Test for parent is {Glucose,Sodium}, and has a count of 2. This count is stored as the significant value 62 of storage sequence 57. Upon creation of Potassium as a new attribute of Test, the count of Test is incremented by 1, and the resulting updated family count, 3, is the child identifier corresponding to new attribute, Potassium.

Figures 14, 15:
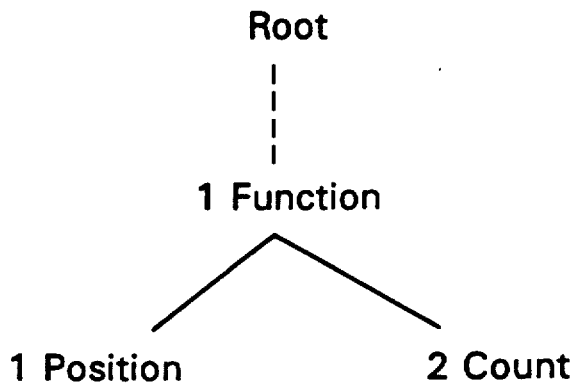
FIGS. 14 and 15 are diagrams describing the initial storage sequences stored by init( ) to initialize an application database, showing respectively, initial dependencies, and initial storage sequences with corresponding data statements.

FIG. 14 shows the hierarchy of dependencies for initial attributes, which are the basis for the initial storage sequences stored by init( ) in order to initialize an application database. Initial storage sequences are used by create( ) in order to compute the child identifier and hierarchical position of a newly created attribute.

For each new attribute created, create( ) stores an updated count of the new attribute's family which is stored under the family's name. For attributes with parents, the family name is the name of the parent. For example, referring to FIG. 5, the family name of Complaint is Visit. Upon creating a new attribute, create( ) stores the hierarchical position of the new attribute under the new attribute's name, which is the family name of any future children of the new attribute. Family names, counts and hierarchical positions are stored as values of attributes: family names as values of Function, counts as values of Count, and hierarchical positions as values of Position. The dependencies of these initial attributes are illustrated in FIG. 14. Also shown is Root which names the family of roots, but is not itself an attribute. The figure shows Function to be a root having Position and Count as children. The figure also shows child identifiers corresponding to the initial attributes: Function, the only root, has child identifier 1, Position, the first child of Function, has child identifier 1, and Count, the second child of Function, has child identifier 2. The hierarchical position of Function is 1, of Position 1.1, and of Count 1.2.

FIG. 15 shows data statements and their respective initial storage sequences 64–68, which correspond to the hierarchy depicted in FIG. 14. Count('Root') and Count('Function') are, respectively, the number of attributes of families Root and Function. Position('Function'), Position('Position') and Position('Count') are respectively the hierarchical positions of attributes Function, Position and Count.

Initial storage sequences correspond to the shown data statements. For example, Count ('Root')='1' has dependency path Function.Count (FIG. 14), and, therefore, has model assertion Function='Root',Count='1'. The child identifier of Function is 1 and of Count 2, so that the storage sequence encoding the model assertion is 1,'Root',2,'1' which is storage sequence 64.

Figure 16:
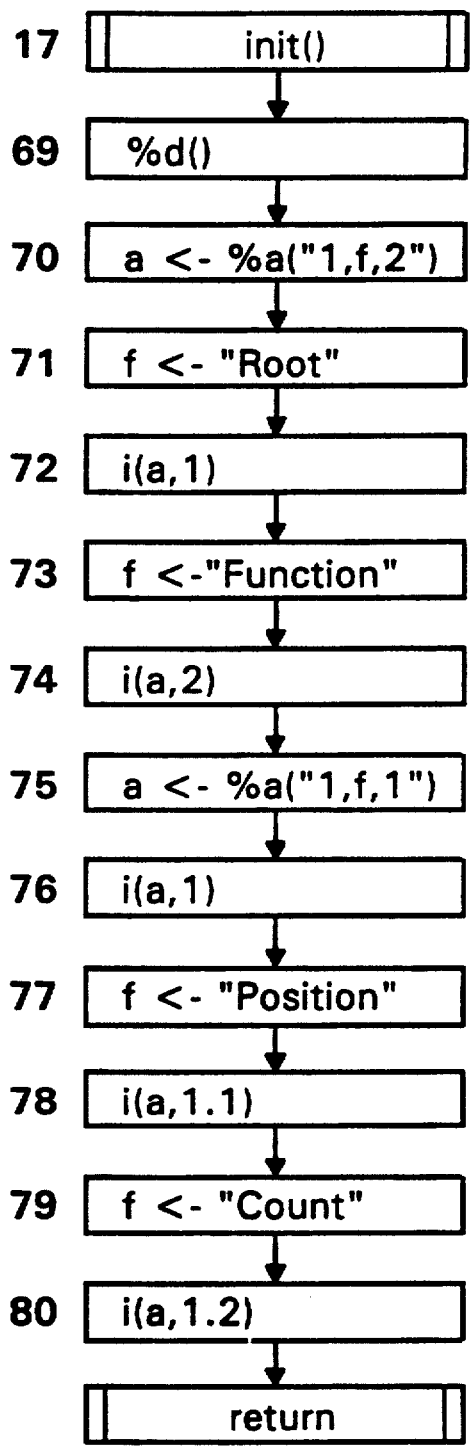
FIGS. 16, 17 and 18 are flowcharts, respectively, of procedures init( ), translate( ) and create( ), which implement the central data management methods for representing hierarchical functional dependencies.

FIG. 16 is a flowchart of init( ) 17, illustrating the storage of initial storage sequences 64–68.

In step 69, % d( ) clears d of all storage sequences.

In step 70, variable a is set to d(1,f,2).

In step 71, variable f is set to Root.

In step 72, i( d(1,f,2),1) inserts 1 at d(1,f,2), storing, since f=Root, 1,'Root',2,'1' 64.

In step 73, variable f is set to Function.

In step 74, i( d(1,f,2),2) inserts 2 at d(1,f,2), storing, since f=Function, 1,'Function',2,'2' 66.

In step 75, variable a is set to d(1,f,1).

In step 76, i( d(1,f,1),1) inserts 1 at d(1,f,1), storing, since f=Function, 1,'Function',1,'1' 65.

In step 77, variable f is set to Position.

In step 78, i( d(1,f,1),1.1) inserts 1.1 at d(1,f,1), storing, since f=Position, 1,'Position',1,'1.1' 67.

In step 79, variable f is set to Count.

In step 80, i( d(1,f,1),1.2) inserts 1.2 at d(1,f,1), storing, since f=Count, 1,'Count',1,'1.2' 68.

Figure 17:
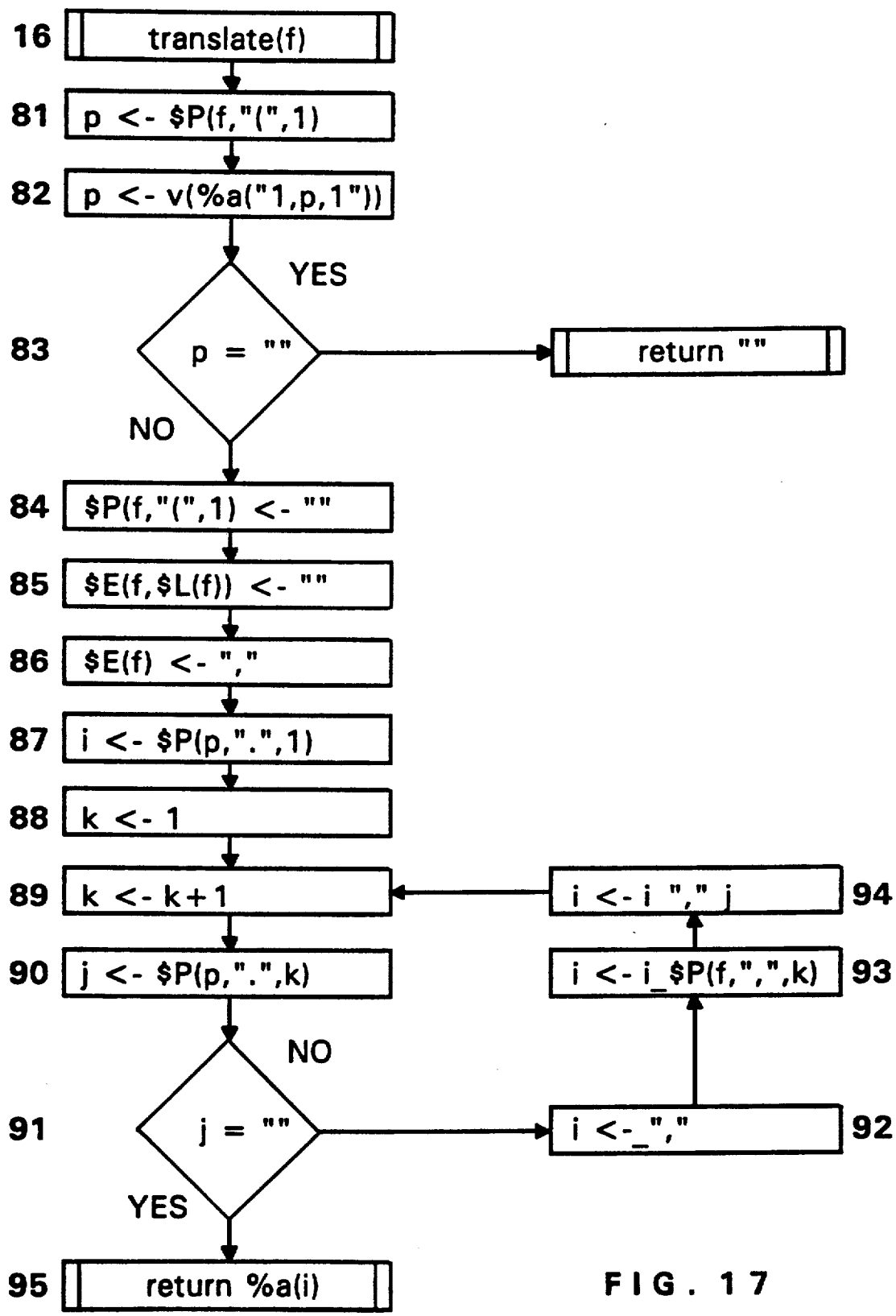

FIG. 17 is a flowchart of translate(f) 16. The flowchart will be explained using an example invocation having argument f set to function instance 22, Complaint('Sam','1/1/90') (FIG. 11).

In step 81, variable p is set to the first (−piece of variable f, giving p=Complaint.

In step 82, v(% a(1,p,1)) retrieves the first significant value at d(1,p,1). Since p=Complaint, the addressed storage sequence is 55, 1,'Complaint',1,'2.3.1' (FIG. 13), and significant value 60, '2.3.1', is retrieved. Variable p is set to the retrieved significant value, giving p=2.3.1.

In step 83, p=2.3.1 fails the test for empty string " ".

In step 84, the first (−piece of variable f is erased, giving f=('Sam','1/1/90').

In step 85, the last character of variable f is erased, giving f=('Sam','1/1/90'.

In step 86, the first character of variable f is replaced with ",", giving f=,'Sam','1/1/90'.

In step 87, variable i is set to the first .−piece of p, giving i=2.

In step 88, variable k is set to 1.

In step 89, variable k is incremented by 1, giving k=2.

In step 90, variable j is set to the 2nd .−piece of p, giving j=3.

In step 91, j=3 fails the test for empty string " ".

In step 92, variable i is concatenated to ",", giving i=2,.

In step 93, variable i is concatenated to the 2nd .−piece of f, giving i=2,'Sam'.

In step 94, variable i is concatenated to ",", which is concatenated to j, giving i=2,'Sam',3.

In step 89, variable k is incremented by 1, giving k=3.

In step 90, variable j is set to the 3rd .−piece of p, giving j=1.

In step 91, j=1 fails the test for empty string " ".

In step 92, variable i is concatenated to ",", giving i=2,Sam,3,.

In step 93, variable i is concatenated to the 3rd ,−piece of f, giving i=2,'Sam',3,'1/1/90'.

In step 94 variable i is concatenated to ",", which is concatenated to j, giving i=2,'Sam',3,'1/1/90',1.

In step 89, variable k is incremented by 1, giving k=4.

In step 90, variable j is set to the 4th .−piece of p, giving j=" ".

In step 91, j=" " passes the test for empty string " ".

In step 95, % a(2,'Sam',3,'1/1/90',1) adapts address sequence 2,'Sam',3,'1/1/90',1 (FIG. 11), in variable i, to storage address 48 d(2,'Sam',3,'1/1/90',1), which is returned by translate( ).

Figure 18:
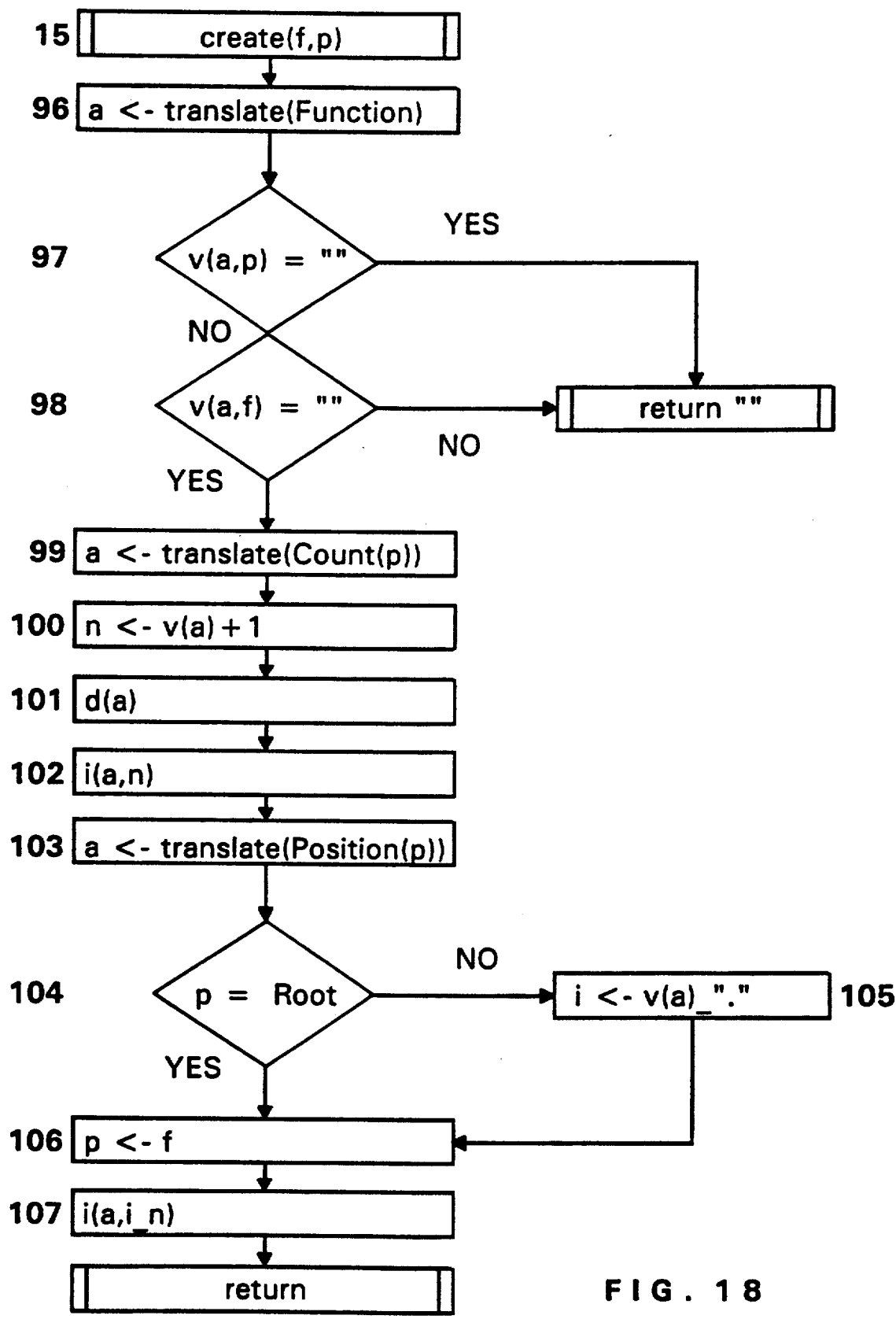

FIG. 18 is a flowchart for create(f,p) 15, which creates a new attribute of a specified family. Argument f is the name of the new attribute, and argument p is the name of the new attribute's family. The flowchart will be explained by means of an example: create(Potassium,Test). FIG. 6 shows that the desired result of this invocation of create( ) is to increment the count of Test by 1 from 2 to 3, and to compute, for Potassium, child identifier 3 and hierarchical position 2.3.2.3.

In step 96, variable a is set to storage address d(1) of function instance Function, returned by translate(Function), giving a= d(1).

In step 97, v( d(1),'Test') retrieves significant value 58, 'Test' (FIG. 13), of storage sequence 1,'Test', which is nested within storage sequence 56. 'Test' fails the test for empty string " ".

In step 98, v( d(1),'Potassium') attempts to retrieve significant value 'Potassium' from storage address d(1), but, in conformity with FIG. 13, does not find 'Potassium' at d(1). v( d(1),'Potassium') therefore returns empty string " ", which passes the test.

In step 99, variable a is set to storage address d(1,p,2) of function instance Count(p), returned by translate(Count(p)), giving a= d(1,p,2).

In step 100, variable n is set to the significant value retrieved by v( d(1,p,2)) incremented by 1. Since p=Test, v( d(1,p,2)) retrieves significant value 62, '2', of storage sequence 57, 1,'Test',2,'2' (FIG. 13), giving n=3.

In step 101, d( d(1,p,2)), since p=Test, deletes storage sequence 57.

In step 102, i( d(1,p,2),3), inserts 3 at ( d(1,p,2), storing storage sequence 1,'Test',2,'3', which encodes Count('Test')='3'. This changes the count of Test to 3 as desired.

In step 103, variable a is set to storage address d(1,p,1) of function instance Position(p), returned by translate(Position(p)), giving a= d(1,p,1).

In step 104, p=Test fails the test for Root.

In step 105, variable i is set to the significant value retrieved by v( d(1,p,1)) concatenated to ".". Since p=Test, v( d(1,p,1)) retrieves significant value 61, '2.3.2', of storage sequence 56, 1,'Test',1,'2.3.2' (FIG. 13), which, concatenated to ".", gives i="2.3.2.".

In step 106 variable p is set to Potassium.

In step 107 i( d(1,p,1),2.3.2._3) inserts 2.3.2. concatenated to 3, which is 2.3.2.3, at storage address d(1,p,1). Since p=Potassium, the insertion stores storage sequence 1,'Potassium',1,'2.3.2.3', encoding Position('Potassium')='2.3.2.3'. This assigns hierarchical position 2.3.2.3 to Potassium, as desired.

The method of the present invention is general, permitting many variations. Any assignment of child identifiers which distinguishes sibling attributes is acceptable. One could, for example, assign all child identifiers in one sequence for all attributes; or, one could assign an attribute's name as its child identifier. Hierarchical positions need not be explicitly stored. One could instead store the child identifier and a pointer to an attribute's family, and trace back the hierarchical position. Formal expressions need not be limited to function instances. Many additional encoding techniques are possible, including the use of address sequences for referencing. Finally, the method can, in principle, be implemented for any database, provided deletion of a storage sequence deletes all its extensions.

There has thus been shown and described a method of data management for representing hierarchical functional dependencies of application data which fulfills all the objects and advantages sought therefor. Application data dependencies are represented by formal expressions for reference and as storage sequences for storage. Upon storage and deletion of application values, dependencies are enforced. Multiple values may be stored for a function instance and new attributes may be created at any time.

The foregoing description of the preferred embodiment of the invention has been presented :or the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

-continued

APPENDIX

```
                ;Copyright (C) 1991 Jonathan Buckwold
                ;Written in DataTree MUMPS Version 4.2
                ;ALL basic variable names MUST begin with '%'.
                ;NO variable names beginning with '%' may be used elsewhere.
%d()            ;init
                K d Q
%a(%i)          ;adapt to storage address
                Q " d("_%i_")"
o()             ;open
                ZZSWITCH +2 Q
c()             ;close
                Q
v(%a,%)         ;value
                Q $S(%="":$$n(%a),$D(@%a@(%)):%,1:"")
n(%a,%)         ;next value
                Q $O(@%a@(%))
p(%a,%)         ;previous value
                Q $ZP(@%a@(%))
i(%a,%,%f)      ;insert
                S:%'="" @%a@(%)="" K %
                F %f=$L(%a):-1:1 I $E(%a,%f)="," S %='% I % S %=$E(%a,1,%f-1)_")"
Q:$D(@%)#10     S @%="",%=1
                Q
d(%a,%)         ;delete
                I %="" K @%a Q
                K @%a@(%) Q
translate(%f,%p,%i,%j,%k)       ;instance to storage address
                S %p=$P(%f,"(",1),%p=$$v($$%a("1,%p,1")) Q:%p="" ""
                S $P(%f,"(",1)="",$E(%f,$L(%f))="",$E(%f)=",",%i=$P(%p,".",1)
                F %k=2:1 S %j=$P(%p,".",%k) Q:%j=""   S %i=%i_","_$P(%f,",",%k)_","_%j
                Q $$%a(%i)
create(%f,%p,%a,%n,%i)          ;new attribute
                S %a=$$translate("Function") Q:$$v(%a,%p)=""  Q:$$v(%a,%f)'=""
                S %a=$$translate("Count(%p)"),%n=$$v(%a)+1 D d(%a),i(%a,%n)
                S %a=$$translate("Position(%p)") S:%p'="Root" %i=$$v(%a)_"."
                S %p=%f D i(%a,%i_%n) Q
init<>                          ;initial configuration
                D %d()
                F %i=1:1 S %t=$T(0+%i),$E(%t,1,2)="" Q:%t=""   D
i($$%a($P(%t,"=",1)),$P(%t,"=",2))
                Q
o
                ;1,"Root",2=1
                ;1,"Function",1=1
                ;1,"Function",2=2
                ;1,"Position",1=1.1
                ;1,"Count",1=1.2
x               ;JB;09:52 PM   24 Apr 1991;Example Application
                D o B(),init B(),A(1),c B() Q
A<1>            ;construct application and insert data
                F d=0,1 D:d p() F S T=$T(application+I),I=I+1 Q:"data"[T  S
$E(T,1,2)="" D make():'d,use():d
                Q
make(I) S $ZP="=",parent=T.1,n=T.2,$ZP=","
                F I=1:1 S new=n.I Q:new=""   D create B(new,parent) S:parent'="Root"
p(new)=p(parent)_parent_","
                Q
use(I)  F I=1:1 S $ZP=",",P=T.I Q:P=""   S $ZP="=",f=P.1,v=P.2,@f=v D ...
... i B($$translate B(f_p(f)),v)
                Q
p(I)            F S I=$O(p(I)) Q:I=""   S P=p(I),$E(P,$L(P))=")"p(I)="("_P
                Q
application
                ;Root=Person
                ;Person=Birthday,Sex,Visit
                ;Visit=Complaint,Test,Therapy
                ;Test=Glucose,Sodium
                ;Therapy=Indication
data
                ;Person=Mary,Birthday=1/1/90,Visit=1/1/90,Complaint=maternal ...
... diabetes,Test=blood,Glucose=40,Therapy=IV dextrose
                ;Person=Sam,Birthday=10/3/80,Visit=1/1/90,Complaint=weakness ...
... Complaint=pallor,Test=blood,Glucose=70,Therapy=orangejuice,Indica ...
... tion=hypoglycemia,Therapy=education,Indication=insulin overdose
                ;Person=Joe,Visit=1/1/90,Test=blood,Sodium=150,Test=urine,So ...
... dium=5,Therapy=fluid restriction,Indication=SIADH
```

What is claimed is:

1. In a data processing system having processor means, memory means, and an executing application program that references application data comprising values of attributes, said application data stored in said memory means and accessed via said processor means, a data management method for representing hierarchical functional dependencies of said application data, said hierarchical functional dependencies being relationship between attributes, said relationships defining, for a specified attribute, a path, a family and at most one parent, said path having as terminal attribute said specified attribute, said family being, when said specified attribute has no parent, the collection of all attributes having no parent, said family being, when said specified attribute has one parent, the collection of all attributes having said one parent, said data management method comprising the steps of:

(a) generating a new attribute having a specified name and of a specified family, said generating step (a) comprising the substeps of:
- (a-0) storing said specified name in said memory means,
- (a-1) computing a child identifier corresponding to said new attribute, said child identifier being distinct from the child identifiers corresponding to previously generated attributes of said specified family;
- (a-2) storing said child identifier in said memory means;

(b) storing application data as a storage sequence, said storage sequence comprising, in the order of a path, the child identifier and an asserted value of each attribute in said path;

(c) identifying a particular storage sequence which contains a desired particular application data by specifying the attribute of said particular application data and values of the attributes preceding said specified attribute in its path; and (d) retrieving said particular application data from said particular storage sequence by retrieving at least a portion of said particular storage sequence for processing by said processor means.

2. The method of claim 1 wherein said values of attributes are character strings.

3. The method of claim 1 wherein said child identifier corresponding to said new attribute is a count of attributes of said specified family.

4. The method of claim 1 wherein said storing substep (a-2) stores a sequence of child identifiers corresponding to the path of said new attribute.

5. The method of claim 1 comprising the additional step of:

deleting, from said memory means, a specified storage sequence and each storage sequence sharing said specified storage sequence as a common initial sequence.

6. The method of claim 1 wherein said storage sequence comprising said child identifiers and said asserted values is a sequence of indices of a hierarchical data structure, each said child identifier and each said asserted value stored, individually, as one of said indices.

7. The method of claim 1 comprising the additional step of:

generating initial attributes by storing, in said memory means, initial storage sequences, wherein said specified name of substep (a-0) and said child identifier of substep (a-2) are stored as values of said initial attributes.

8. In a data processing system having processor means, memory means, and an executing application program that references application data comprising values of attributes, said application data stored in said memory means and accessed via said processor means, a data management method for representing hierarchical functional dependencies of said application data, said hierarchical functional dependencies being relationships between attributes, said relationships defining, for a specified attribute, a path, a family and at most one parent, said path having as terminal attribute said specified attribute, said family being, when said specified attribute has no parent, the collection of all attributes having no parent, said family being, when said specified attribute has one parent, the collection of all attributes having said one parent, said data management method comprising the steps of:

(a) generating a new attribute having a specified name and of a specified family, said generating step (a) comprising the substeps of:
- (a-0) storing said specified name in said memory means,
- (a-1) computing a child identifier corresponding to said new attribute, said child identifier being distinct from the child identifiers corresponding to previously generated attributes of said specified family;
- (a-2) storing said child identifier in said memory means;

(b) storing application data as a storage sequence, said storage sequence comprising an address sequence followed by one significant value, said address sequence encoding a partial assertion, said partial assertion having an associated path, said partial assertion assigning to each non-terminal attribute of said associated path, an asserted value, said address sequence comprising, in the order of said associated path, the child identifier and asserted value of each non-terminal attribute of said associated path, said one significant value being an asserted value of the terminal attribute of said associated path;

(c) identifying a particular storage sequence which contains a desired particular application data by specifying the attribute of said particular application data and values of the attributes preceding said specified attribute in its path; and (d) retrieving said particular application data from said particular storage sequence by retrieving at least a portion of said particular storage sequence for processing by said processor means.

9. The method of claim 8 comprising the additional step of:

translating a formal expression to a storage address, said formal expression encoding a partial assertion, said storage address defining locations, in said memory means, of referenced values, each of said referenced values being the significant value of a storage sequence, the address sequence of said storage sequence encoding said partial assertion.

10. The method of claim 9 wherein said formal expression is a function instance, said function instance having one name and zero or more arguments, said name being the name of the terminal attribute of the associated path of said partial assertion, said arguments comprising the asserted values assigned by said partial assertion.

11. The method of claim 9 comprising the additional step of:
retrieving, from said memory means, one of said referenced values located at a specified storage address.

12. The method of claim 9 comprising the additional step of:
deleting from said memory means a specified value located at a specified storage address.

13. The method of claim 12 comprising the additional step of:
deleting from said memory means all referenced values located at a specified storage address.

14. The method of claim 9 comprising the additional step of:
inserting a specified value, into said memory means, at a specified storage address.

15. The method of claim 14 comprising the additional step of:
inserting at a specified storage address, a sequence of child identifiers corresponding to the path of a specified attribute.

16. The method of claim 15 comprising the additional step of:
inserting, at a specified storage address, a count of attributes of a specified family.

17. In a data processing system having processor means, memory means, and an executing application program that references application data comprising values of attributes, said application data stored in said memory means and accessed via said processor means, a data management method for representing hierarchical functional dependencies of said application data, said hierarchical functional dependencies being relationships between attributes, said relationships defining, for a specified attribute, a path, a family and at most one parent, said path having as terminal attribute said specified attribute, said family being, when said specified attribute has no parent, the collection of all attributes having no parent, said family being, when said specified attribute has one parent, the collection of all attributes having said one parent, said data management method comprising the steps of:

(a) generating a new attribute having a specified name and of a specified family, said generating step (a) comprising the substeps of:
(a-0) storing said specified name in said memory means,
(a-1) computing a child identifier corresponding to said new attribute, said child identifier being distinct from the child identifiers corresponding to previously generated attributes of said specified family;
(a-2) storing said child identifier in said memory means;

(b) expressing application data as a function assignment, said function assignment having one name, one significant value, and zero or more arguments, said function assignment assigning one asserted value to each attribute of an associated path, said name being the name of the terminal attribute of said associated path, said significant value being said asserted value assigned to said terminal attribute, said arguments being said asserted values assigned to the non-terminal attributes of said associated path;

(c) storing application data as a storage sequence, said storage sequence encoding a function assignment, said storage sequence comprising, in the order of said associated path of said function assignment, the child identifier and asserted value of each attribute in said associated path;

(d) identifying a particular storage sequence which contains a desired particular application data by specifying the attribute of said particular application data and values of the attributes preceding said specified attribute in its path;

(e) retrieving said particular application data from said particular storage sequence by retrieving at least a portion of said particular storage sequence for processing by said processor means.

* * * * *